T. A. EDISON.
Synchronous Movements for Electric Telegraphs.
No. 200,032.        Patented Feb. 5, 1878.
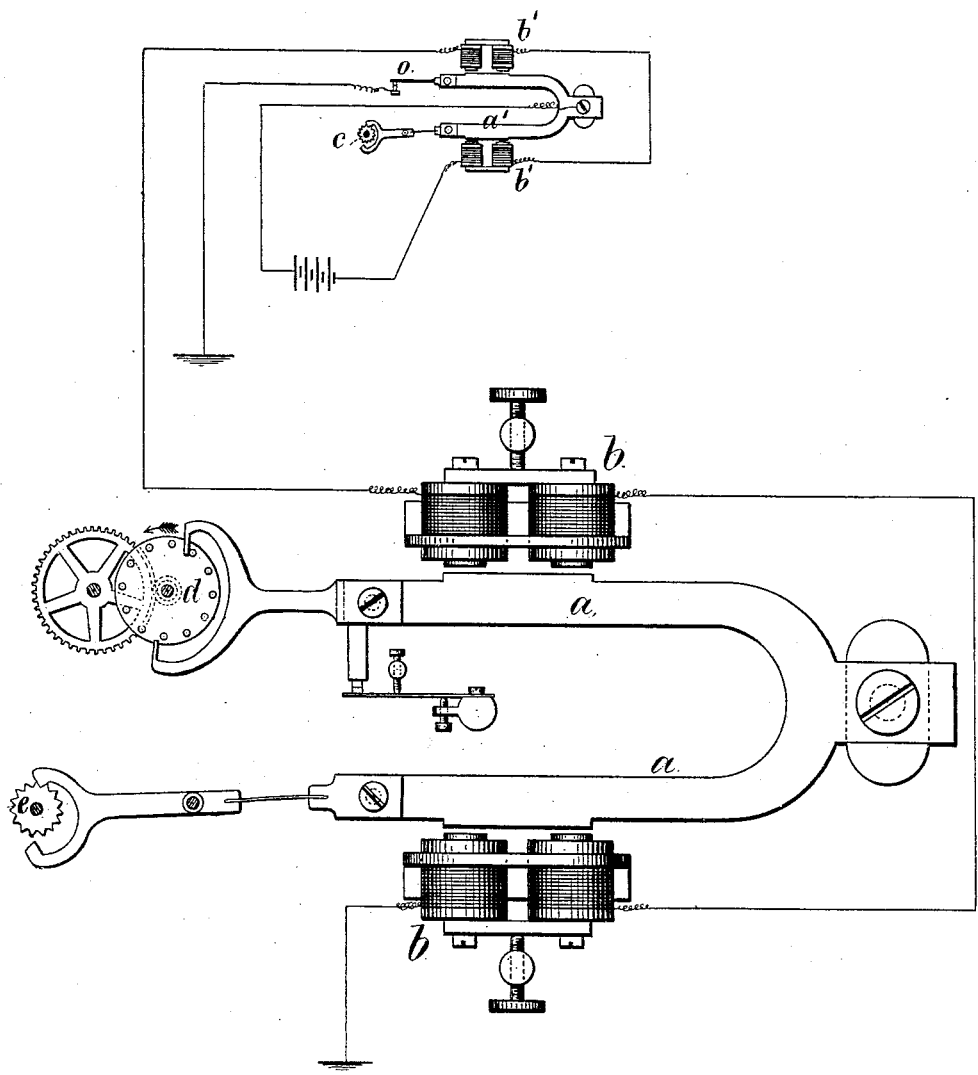
Witnesses  
Chas. H. Smith  
Geo. T. Pinckney  
Inventor,  
Thomas A. Edison.  
per Lemuel W. Serrell  
Atty

UNITED STATES PATENT OFFICE.

THOMAS A. EDISON, OF MENLO PARK, NEW JERSEY.

IMPROVEMENT IN SYNCHRONOUS MOVEMENTS FOR ELECTRIC TELEGRAPHS.

Specification forming part of Letters Patent No. 200,032, dated February 5, 1878; application filed November 1, 1876.

*To all whom it may concern:*

Be it known that I, THOMAS A. EDISON, of Menlo Park, in the county of Middlesex and State of New Jersey, have invented an Improvement in Synchronous Movements, of which the following is a specification:

The object of this invention is to produce the rotation of two or more shafts in perfect unison, whether they are near each other or more or less remote. This is available for controlling the movement of type-wheels in printing-telegraphs at distant stations, or for regulating the rotation of other mechanisms.

I make use of a reed or tuning-fork carefully tuned, and kept in vibration by the action of one or more electro-magnets; and in cases where the reeds or tuning-forks are in different places in the electric circuit the movement of one of such tuning-forks governs the electric pulsations passing to the others. This insures uniformity of vibration.

The electric circuits may be arranged in any desired known manner. Circuits of this character have been used by me.

In the drawing, $a$ $a'$ represent tuning-forks; $b$ $b'$, the magnets for operating upon them to maintain the vibration, and $o$ a circuit-opener to make and break the electric circuit in which the electro-magnets are placed. $c$ $d$ $e$ are the shafts that are to be regulated in unison. There may be two or more of them.

Upon each shaft is a ratchet or escapement wheel, and upon the tuning-fork or reed is an arm carrying pallets or an escapement.

If a train of gearing and a weight or spring is used to revolve either of the shafts, the pallets will be shaped as an escapement to allow the wheel and shaft to rotate only at the speed resulting from the vibrations of the escapement by the reed or tuning-fork.

If the pallets are made wedge-acting, so as to move the wheel and shaft around by the vibration of the pallets, then the shaft may receive its revolving power from the reed itself.

Under any circumstances the speed of revolution will be the same in all the shafts if the number of teeth on the wheels is the same, or proportionate if the number of teeth is different, the vibrations of the pallets being in all instances the same.

I claim as my invention—

1. The combination, with a reed or tuning-fork, and an electro-magnet and circuit-breaker to maintain the vibration thereof, of pallets, a toothed wheel, and a shaft receiving its revolving motion from, or being controlled by, the vibrations of the reed or tuning-fork, substantially as set forth.

2. The combination of two or more reeds or tuning-forks, corresponding electro-magnets, and a circuit-breaker with two or more revolving shafts, toothed wheels, and pallets moved by the vibration of the reeds, substantially as and for the purposes set forth.

Signed by me this 30th day of October, A. D. 1876.

THOS. A. EDISON.

Witnesses:
GEO. T. PINCKNEY,
HAROLD SERRELL.